United States Patent [19]

Langille et al.

[11] Patent Number: 5,837,346
[45] Date of Patent: Nov. 17, 1998

[54] PROJECTION SCREENS HAVING LIGHT COLLIMATING AND LIGHT DIFFUSING PROPERTIES

[75] Inventors: William Langille, Amherst, N.H.; Robin Clabburn, Sevenhampton, United Kingdom

[73] Assignees: Nashua Corporation, Nashua, N.H.; Nashua Photo Limited, United Kingdom

[21] Appl. No.: 749,983

[22] Filed: Nov. 15, 1996

[30] Foreign Application Priority Data

Nov. 27, 1995 [GB] United Kingdom ................... 9524220

[51] Int. Cl.$^6$ ..................................................... G03B 21/60
[52] U.S. Cl. ....................... 428/141; 428/156; 428/912.2; 428/913; 359/454; 359/455; 359/456; 359/459; 359/460; 359/443; 359/452; 359/453; 359/457; 430/290; 264/496
[58] Field of Search ..................................... 428/141, 156, 428/912.2, 913; 359/454, 455, 456, 459, 460, 443, 452, 453, 457; 430/290; 264/496

[56] References Cited

U.S. PATENT DOCUMENTS

| | | | |
|---|---|---|---|
| 3,492,060 | 1/1970 | Sherwood | 350/117 |
| 3,598,470 | 8/1971 | Vetter | 350/117 |
| 4,232,939 | 11/1980 | Kikuchi | 350/129 |
| 4,721,361 | 1/1988 | van de Ven | 350/128 |
| 4,911,529 | 3/1990 | Van De Ven | 350/127 |
| 4,991,933 | 2/1991 | Park | 350/129 |
| 5,341,231 | 8/1994 | Yamamoto et al. | 359/49 |
| 5,442,482 | 8/1995 | Johnson et al. | 359/619 |
| 5,473,469 | 12/1995 | Magocs et al. | 359/449 |
| 5,609,939 | 3/1997 | Petersen et al. | 428/141 |

FOREIGN PATENT DOCUMENTS

| | | |
|---|---|---|
| 0311189 | 12/1989 | European Pat. Off. . |
| 1580722 | 12/1980 | United Kingdom . |
| WO 95/31751 | 11/1995 | WIPO . |

*Primary Examiner*—William P. Watkins, III
*Attorney, Agent, or Firm*—Testa, Hurwitz & Thibeault, LLP

[57] ABSTRACT

Various forms of light-diffusing screen are disclosed comprising plastics sheets having surface texturing of some kind, adding to or modifying the diffusing effect. The plastics sheets may have bulk diffusing characteristics in addition to the surface texturing. The surface texturing may be produced by, for example, embossing or by molding the plastics against a textured surface such as a "brushed" surface or a ribbed or grooved surface imparting asymmetrical diffusion characteristics to the screen.

26 Claims, 1 Drawing Sheet

PROJECTION SCREENS HAVING LIGHT COLLIMATING AND LIGHT DIFFUSING PROPERTIES

FIELD OF THE INVENTION

This invention relates to a material suitable for use as a light diffusing screen, a rear projection screen, a front projection screen, and or analogous purposes, such as in reflective signs.

BACKGROUND OF THE INVENTION

It is well known that the important parameters of projection screen materials include brightness, that is, the amount of light from the image source reaching the viewer, and the angles from the perpendicular to the surface of the material over which an acceptable brightness level (usually in excess of 50% of the maximum) is maintained.

In the following, reference is made to the "angle of view". In this specification, the term "angle of view" refers to the range of viewing angles of observers relative to a diffusing screen or a rear projection screen over which the apparent brightness of the screen is within 50% or more of the apparent brightness to an observer viewing the screen at right angles assuming that the light incident on the screen is incident along the normal to the screen. This figure is often referred to as "full width half maximum" or "fwhm". By way of example, the angle of view may be measured by illuminating a small area of the screen material by a laser beam (although some other collimated light beam may be used) directed normally to the plane of the screen and measuring the light diffused or reflected from that small area (according to whether a light diffusing screen such as a back projection screen or a reflective screen such as a front projection screen is involved) over a range of angles. Furthermore, in the following, the expression "angle of view for transmission" means "angle of view" defined as above for a screen of light diffusing material illuminated by a projector or the like disposed on the opposite side of the plane of the screen from the observer, i.e. for a rear projection screen. Similarly, the expression "angle of view for reflection" means "angle of view" defined as above for a screen of light reflective material illuminated by a projector or the like disposed on the same side of the plane of the screen as the observer, i.e. for a front projection screen.

Established methods for producing materials suitable for front projection screens and for analogous purposes include, on the one hand, the lamination of light diffusing films to specular or "mirror like" surfaces and, on the other hand, incorporating geometric features into such surfaces, for example corner cube arrays. Where a light diffusing material is laminated to a mirror like surface, the angle of view for reflection is approximately double the angle of view for transmission for small to moderate angles of view. With a front projection screen produced by incorporating geometric features in a reflective surface the angle of view is determined in part by the geometry of such features. Where a light diffusing material is laminated to a reflective surface, increases in angle of view to achieve appropriate reflective characteristics may be impossible or may be obtainable only to the detriment of some other important factor such as brightness (reduced if film thickness is increased), flexibility, or cost. Where reflective diffusion is obtained by providing an array of geometric features, the angle of view can only be changed by changing the geometric features. The geometric features can only be changed by changing the mold, press tools, or other tools used to produce these features and this is expensive.

Various proposals for light diffusing materials suitable for projection screens have been made in the past. For example, EP0294122 discloses a light diffusing sheet material which comprises a photopolymer in which an array of graded refractive index lenses has been formed by selective photopolymerization. W094/29768 discloses improved techniques for forming such a light diffusing material.

U.S. Pat. Nos. 53,072,205 and 3,751,527 disclose a light-diffusing screen material which comprises a polymethyl methacrylate matrix in which is embedded a plurality of small substantially spherical particles of different refractive index from the matrix.

SUMMARY OF THE INVENTION

It is among the objects of the invention to provide an improved light diffusing material suitable for use as a back projection screen, to provide an improved material suitable for use as a front projection screen or in reflective signs or in analogous applications, and to provide improved methods of manufacturing such materials.

According to one aspect of the invention, there is provided a light diffusing polymeric material on at least one surface of which are created surface features enabling the diffusion characteristics to be modified in a chosen or preferred manner.

According to another aspect of the invention, there is provided a method of making a light diffusing material comprising the steps of forming a sheet of a polymeric material having bulk light-diffusing characteristics and providing at least one surface of said sheet with surface features enabling the diffusion characteristics of the material to be modified in a chosen or preferred manner.

According to yet another aspect of the invention there is provided a method of making a material suitable for a light diffusing screen, back projection screen or, in combination with a light reflective layer or coating, a front projection screen, the method comprising: providing a substrate having a textured surface; applying to said textured surface so as to conform closely therewith a layer of a light transmitting radiation-polymerisable material; exposing said layer to a pattern of polymerizing radiation from the side of said layer of material remote from said substrate so as to cause selective polymerization of said material and thereby form an array of graded refractive index lenses or other optical features and/or form corresponding relief features on the surface of said material remote from said textured surface.

According to yet another aspect of the invention, there is provided a light diffusing material comprising a sheet of polymer having a first, textured surface and having an array of localized refractive index variations therein and/or an array of relief features on the other surface of said sheet.

According to yet another aspect of the invention, there is provided a light reflective material suitable for a front projection screen, comprising a light diffusing material according to the previously noted aspect having a light reflective layer or coating applied to said first, textured surface.

According to a still further aspect of the invention, there is provided a light diffusing material comprising two or more layers of light transmitting material each having respective bulk or volume light-diffusing characteristics.

According to a still further aspect of the invention there is provided a material suitable for use as a front projection screen comprising a material according to the previously noted aspect having a reflective layer or coating applied to one surface thereof.

Any one or more of said layers may have surface texturing or relief characteristics on one or both surfaces thereof.

According to another aspect of the invention there is provided a method of making a light diffusing material comprising forming a sheet of a polymeric material having bulk light diffusing characteristics and providing at least one surface of said sheet with surface features enabling the diffusion characteristics of the material to be modified in a chosen or preferred manner.

DETAILED DESCRIPTION OF THE INVENTION

Figure 1:
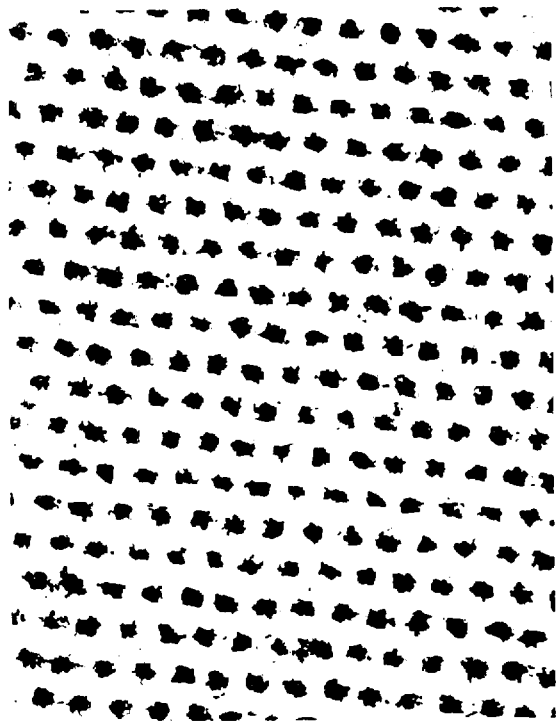
FIG. 1 is a schematic representation of a photomicrograph of an embossing plate for forming nominally circular "dots"

In some applications there is a need for a rear projection screen, or diffuser, which also has pronounced collimating properties. For example, compact rear-projection display devices may utilize projection lenses which are relatively close to the screen, relative to the width and height of the screen, so that satisfactory elimination of a "hot spot" is not practicable relying solely upon symmetrical, or even asymmetrical, diffusion characteristics. Similarly, backlit LCD display screens, such as are utilized in portable computers, may have a light-diffusing screen interposed between the back of the LCD screen and a relatively localized light source or an array of relatively localized light sources disposed relatively close to the LCD screen, so that individual "hot spots" corresponding to the light sources may be detectable. To address such situations it is proposed, in some variants of the present invention, to provide screens having both diffusing and collimating properties. One way in which this may be done is to provide one surface of a light-transmitting screen, for example of plastics, with an optical structure comprising ribs or grooves of triangular or frusta triangular section, for example, forming Fresnel lenses specifically adapted to the anticipated illumination conditions, and to provide the other surface as a textured diffusing surface, and/or to provide the light transmitting sheet with bulk diffusing characteristics by any of the techniques described herein. In a further variant, both surfaces of the light-transmitting sheet material may be configured for collimation, for example by being formed with such triangular section ribs after the fashion of Fresnel lenses, with the sheet material having bulk light-transmitting characteristics.

In further variants, combined light-collimating and light-diffusing screens or backlighting devices may be formed by laminating a plurality of individual light transmitting sheets, some of which are formed as collimators and some as diffusers or two or more of which are each formed as combined diffusers and collimators.

In any of the above noted variants, the surface relief features, whether Fresnel lenses, analogous structures, or more or less random texturing, may be formed by hot or cold embossing, by casting, or in any other way. Analogous structures may be produced with reflective rear coatings, for example, to serve as specialized front projection screens. Depending upon the characteristics of the surface provided with the reflective coating such structures may act in part as the mirror counterparts of Fresnel lenses to provide desired direction of light in specific directions.

Whereas the present specification refers to materials as being photo-polymerisable and to polymerizing light or to exposure of photo-polymerisable materials to light to effect polymerization, it will be appreciated that appropriate polymerization may be effected in certain materials, by exposure to other radiation having image forming capabilities, whether electromagnetic radiation (e.g. X-rays) or beams of electrons or other particles and references in the claims and in the description, unless the context indicates otherwise, to "light" photo-polymerisable, photopolymer and photopolymerization are intended to cover all such forms of radiation. Furthermore, in some of the embodiments described below, it is not necessary that polymerization should be dependent on any sort of radiation, but polymerization may be effected, for example, chemically. Indeed, using appropriate printing techniques even selective polymerization, where desired, may be induced chemically.

In some embodiments of the invention, a diffusion screen is formed by casting or otherwise applying a light-transmitting plastics material onto a textured substrate surface of the character described so as to conform intimately with that surface. The material after setting or curing may be left in place to form a light diffusing or reflecting screen in combination with the substrate, according to whether, respectively, the substrate is light transmitting or light reflective. Alternatively, the cured or set material may be stripped off the substrate and used as a light diffuser or back projection screen, either by itself or in combination with other layers, or may be combined with a reflective layer or coating to form, for example, a front projection screen. In the latter case, the reflective coating may be a metallic coating applied by a particulate deposition process, such as by a sputtering, vacuum deposition, or vapor deposition technique, so that the reflective coating conforms very intimately with the textured surface of the texture surface or. Alternatively, the textured material may simply be laminated with a reflective layer, for example, of metallic foil.

The material applied to the textured substrate surface may itself be a material possessing bulk light diffusing characteristics or differential light refracting characteristics which produce an effect analogous to bulk diffusion effects, such as the selectively polymerized MICROSHARP material referred to below. In many applications, the use of a material having bulk light diffusing characteristics allows, for example, projection screens having improved or precisely tailored characteristics, such as angle of view, to be achieved.

In one preferred group of embodiments, the material applied to the textured substrate surface is a radiation-polymerisable material which is exposed to a pattern of polymerizing radiation comprising an array of spots of radiation (or, alternatively, an array of dark spots in an irradiated field) to induce selective polymerization of the material with consequent refractive index gradations throughout the material, resulting in a light dispersing or diffusing effect. Such selective polymerization may be brought about, for example, by applying to the surface of the layer of polymerisable material which is remote from the textured substrate surface a mask comprising an array of radiation-transmitting areas in an opaque surround. The technique may be substantially that disclosed in European Patent No. 0294122 in which the mask apertures are substantially circular, resulting in the production of an array of graded refractive index lenses in the polymerized layer. Alternatively, the mask apertures may be oval or ellipsoidal in shape, with their major axes extending parallel with one another, thereby producing an array of astigmatic graded refractive index lenses, as a result of which the polymer layer has asymmetric characteristics as regards angle of view. Preferably, however, the array of apertures in the mask conforms to a random "speckle" pattern, in which individual apertures are irregularly and randomly shaped. Techniques disclosed in copending International Patent Application No. PCT/GB94/01281 (published as W094/29768) allow such "speckle" masks to be produced which nevertheless have a preferential elongation along one particular axis if an asymmetrical diffusion or reflection characteristic is required. Thus, in manufacture of light diffusing screen, a radiation-polymerisable material may be deposited on a textured substrate surface, an appropriate apertured mask applied to the surface of the polymerisable material from the textured substrate and the resulting laminate exposed to polymerizing radiation through the mask. The mask and substrate are then removed, resulting in a transmissive screen having increased angle of view as compared with a screen made by a similar process but in which the polymer layer, during polymerization, is supported on a smooth surface, for example provided by a smooth Mylar backing, rather than by a textured surface.

Thus, in one embodiment of the invention, a photo-polymerisable light transmitting material is applied, in a layer, to a textured surface of a substrate. The texture of the textured surface of the substrate is preferably provided by a substantially random array of surface relief features on a microscopic near-microscopic scale. By way of example, the substrate might be of glass and the textured surface provided by a ground surface of the glass plate, or the substrate may be metallic, for example, of aluminum or stainless steel provided with a matte or "brushed" surface, affording said textured surface, and formed in any conventional way. A ground or matte surface particularly comprises a plurality of minute pits or minute scratches or grooves arranged randomly with respect to location and orientation. A brushed surface typically comprises likewise, an array of minute grooves or scratches, again arranged randomly with respect to location, but having a preferred orientation. Thus, although all of the grooves in such a brushed surface need not be precisely parallel with one another or, indeed, even approximately so, a major part of the scratches or grooves at least, may be oriented within a limited range of angles relative to a preferred direction in the plane of the surface.

In the above, the references to random may denote arrangements lying anywhere within a wide spectrum of randomness, from arrays which comprise regular elements disposed in arrays which are in effect produced by imparting a small random displacement, linear and/or rotational, to individual elements, or arrays in which individual elements have small random departures from strict identical regularity, to arrangements in which the individual features are of quite irregular shapes without discernible similarities to the shapes of other features and in which additionally the locations of such features are entirely random. For some applications randomness at one end of said spectrum may be appropriate whereas for other applications randomness at the opposite end of said spectrum, or of an order belonging to an intermediate position in said spectrum, may be appropriate.

After application of the photo-polymerisable material, in such a way as to make intimate contact with the textured surface, the layer of photo-polymerisable material is exposed to polymerizing light such as ultraviolet light, to polymerize the material. If the photopolymer is then stripped from the substrate, the surface which was directly in engagement with the textured substrate surface will be textured in a complementary fashion and will, accordingly, have light-diffusing properties. Where the textured substrate surface was one in which the texture was provided by an array of grooves or scratches, the corresponding texture of the photopolymer surface would, of course, comprise corresponding minute ribs or ridges, but the general diffusive effect is much the same whether the textured surface of the photopolymer sheet is a "positive" copy of the textured substrate surface or a "negative."

In some variants, the material applied to the textured substrate surface, after polymerization, is stripped off. If the material is to form a diffusing or back projection screen, the corresponding textured polymer surface may simply be left exposed or a protective transparent foil may be applied over it. If the material is to be used to form a reflective screen, e.g. front projection screen, a light-reflective layer is applied to the textured polymer surface. Of course, if the substrate is metallic, for example aluminum or stainless steel, the polymer layer may be left in place.

It has been found that where the textured substrate surface has a "brushed" character comprising scratches or grooves which are preferentially oriented along, or within a limited range of angles relative to a preferred direction in the plane of the textured surface, the resulting screen is asymmetric, in the sense that the angle of view in a plane perpendicular to the preferred direction of orientation is greater than in a plane parallel with the preferred direction of orientation.

In another variant, the substrate comprises a light diffusing plastics material which comprises a polymethyl methacrylate matrix in which is embedded a plurality of small, substantially spherical particles of different refractive index from the matrix. The light-diffusing substrate material has a matte surface (thought to be due to the embedded spherical particles in the vicinity of the matrix surface deforming the surface). A layer of photo-polymerisable material as discussed above was applied to the light-diffusing substrate material and was photo-polymerized in situ through a mask in the same way as described, in general, above. The photo-polymerized material was found to have bound strongly to the polymethyl methacrylate substrate. The optical properties of the substrate/photopolymer combination, as regards diffusion and angle of view, were improved, as compared with the polymethyl methacrylate substrate alone, or the photo-polymerized product alone.

The light diffusing substrate material, comprising the polymethyl methacrylate matrix with the particles of different refractive index embedded thereon, may be the material supplied under the Registered Trade Mark "Plexiglas-L" by Rohm & Haas Company, Philadelphia, U.S.A. Light diffusing materials of this kind are disclosed in, inter alia, U.S. Pat. No. 5,307,205 and U.S. Pat. No. 3,751,527.

It is possible to provide a material comprising a polymethyl methacrylate matrix in which is embedded a plurality of small substantially spherical particles of different refractive index from the matrix, and in which the diffusion characteristics are asymmetrical, to a controlled degree, by manufacturing or processing the material in such a manner that the matrix is effectively "stretched" along a preferred orientation direction, the resulting material having different angles of view in planes parallel with and perpendicular to the direction of orientation. Using such an asymmetrical material as a substrate support for a polymerisable material during selective polymerization thereof, as described above, results in a material in which, to some extent, combines the favorable characteristics of a graded refractive index polymeric diffusion screen with the advantages of easily obtaining a controlled degree of asymmetry. It will be understood that a front projection screen material may be formed from such a composite material by applying a reflective coating or layer thereto, for example by a particulate deposition process on one of the exposed surfaces of the combination, for example the surface of the polymer remote from the substrate. As disclosed in International Patent Application No. PCT/GB91/00795, for example, under such conditions, if one surface of the polymerisable material is left free to deform during such selective polymerization, that surface tends to adopt a relief characteristic.

In a continuous production process for producing an improved selectively polymerized screen material, by the method described above, the substrate may take the form of a flexible endless conveyor belt, for example, of polyethylene or other plastics, having a supporting surface with a "brushed" texture (that is to say the support surface of the polyethylene belt has a configuration corresponding to that of a "brushed" surface as described above, although such configuration may in practice be produced in the polyethylene by, for example, hot embossing with a brushed metal surface rather than by directly "brushing" or scratching the polyethylene). The radiation-polymerisable material is applied continuously at a predetermined position in the path of said conveyor belt, a continuous masking web being applied to the polymerisable material on the belt, the resulting laminate passed between rollers to ensure intimate contact between the polymerisable material, the masking web and the endless conveyor belt, the laminate, including the belt, thereafter passing under a source of polymerizing radiation to expose the polymerisable material through the clear holes or apertures in the masking web, to produce the desired selective polymerization, and at subsequent points along the conveying path, the masking web is stripped from the polymer and the polymer stripped from the conveyor belt. Where a reflective, e.g. front projection screen is to be produced, the web of polymer may then pass continuously through a vacuum or vapor deposition chamber, via appropriate seal arrangements, where a reflective coating is applied to the side of the web textured by contact with the belt.

The masking web may itself, if desired, be so contoured on its side presented towards the polymerisable material as to produce corresponding contouring or texturing of the respective surface of the polymer web and/or the masking web may be stripped from the polymer before polymerization has been completed so that the respective surface is left free to deform in accordance with the selective polymerization of the material, resulting in an array of microscopic bumps and hollows defining a textured surface.

It is also envisaged that, where it is necessary to provide a relatively hard or tough protective surface for a graded refractive index photopolymeric diffuser, the photopolymer layer may be covered by a protective layer of tougher plastics, such as Mylar or polyethylene, and that such protective layer may be placed in intimate contact with the layer of photo-polymerisable material before photopolymerization to be bonded to the photopolymer by the photopolymerization process, and that in such a case the surface of the protective layer engaging the photopolymer may be a "brushed" or matte or other textured surface adapted to enhance the diffusion characteristics of the resulting combination. In general, the relatively small refractive index difference between the protective layer and the photopolymer layer may minimize the contribution, to the angle of view of the combination, of the interface between the protective layer and the photopolymer, if a protective layer is necessary in any case, any contribution made by the form of said interface will be advantageous.

Further embodiments of the invention are illustrated in the following Example.

EXAMPLE

Three samples of light diffusing material, referred to below as Sample A, Sample B and Sample C were prepared using a photopolymer. The starting material for each sample comprised a layer of a transparent photo-polymerisable material sandwiched between a transparent Mylar (polyester) substrate and a transparent Mylar covering sheet, the photo-polymerisable material being capable of undergoing selective localized polymerization when subjected to selective exposure to polymerizing radiation. Such a starting material is available, for example, from DuPont under the name OMNIDEX under the type HRF150 or HRF600, discussed in more detail in WO95/06887. Such a material is also disclosed in the above mentioned European Patent No. 0294122 and WO94/29768 to which reference should be had.

The first sample, A, of rear projection screen material was prepared by stripping the Mylar covering sheet from the remainder and laminating said remainder with a mask comprising a glass plate with an opaque chrome layer on one surface, the chrome having been removed in selected areas, by etching techniques to form an array of irregular apertures in the chrome layer disposed substantially randomly and without significant anistrophy, these apertures forming corresponding light transmitting areas. In the resulting laminate, the chrome layer was in contact with the photo-polymerisable material.

The photopolymer was then exposed to ultraviolet light through the mask, for five seconds with UV1, then for five minutes to UV2, then for one minute to UV3. The material was then thermally cured for five minutes and subsequently stripped from the mask.

Samples B and C were embossed using embossing plates, as described below. These embossing plates were also prepared by an etching technique, each plate having an initially flat smooth surface through which, by the etching process depressions or pits were formed.

In the embossing plate used for sample B, the depressions took the form of nominally circular "dots" averaging 9.75 $\mu$m in diameter and 10257 Å (Angstrom units) deep, the dots being in a regular array as illustrated in the schematic representation of a photomicrograph which forms FIG. 1 of the drawings appended hereto.

Figure 2:
FIG. 2 is a schematic representation of a photomicrograph of an embossing plate for forming a series of parallel grooves.

In the embossing plate used for sample C, the depressions were in the form of a series of parallel grooves or lines having an average width of 6.5 $\mu$m and an average depth of 6508 Å, as illustrated in the schematic represtation of a photomicrograph which forms FIG. 2 of drawings appended hereto.

Each of samples B and C was prepared by stripping the Mylar cover sheet from the photo-polymerisable material, laminating the respective embossing plate with the photo-polymerisable material (with the photo-polymerisable material in contact with the etched surface), heating the assembly to 120° F. and passing the assembly between cooperating pressure rollers several times to ensure that the photo-polymerisable material was pressed into the depressions or pits in the embossing plate. The assembly was then exposed to ultraviolet light, through the Mylar substrate, to cause polymerization of the photo-polymerisable material, after which the photopolymer, with the Mylar and embossing plate still in place, was thermally cured for 5 minutes after which the photopolymer was stripped from the embossing plate and from the Mylar.

Sample A was divided into three pieces, one of which was, retained as a standard or reference rear projection screen, another of which was laminated with sample B (embossed dot array) to form another rear projection screen and the remaining piece of Sample A was laminated with sample C (embossed line array) to form a further rear projection screen.

The following table sets out the results of tests made, using a goniometer, as to the diffusing power and angle of view for transmission of the sample A reference, the sample A/sample B laminate and the sample A/sample C laminate. The headings 90% AOV, 75% AOV, 50% AOV, and 25% AOV indicate the range of angles relative to the normal to the respective rear projection screen (illuminated by a beam normal to the screen), in a selected plane, over which the apparent brightness was equal to or greater than, respectively 90%, 75%, 50%, and 25% of the apparent brightness of the screen viewed normally. For each screen, such measurements were made with the screen in a first position and in a second position rotated through 90° in the plane of the screen from the first position. In the case of the sample A/sample C laminate, one such position was so selected that the embossed lines lay parallel with the plane in which the angles of view were measured.

TABLE 1

| 90% AOV | 75% AOV | 50% AOV | 25% AOV | COMMENTS |
|---|---|---|---|---|
| 8 | 15 | 29 | 42 | Sample A |
| 6 | 10 | 22 | 40 | Sample A rotated 90° |
| 8 | 16 | 31 | 45 | Sample A laminated to Sample B |
| 7 | 17 | 32 | 46 | Sample A laminated to Sample B rotated 90° |
| 8 | 17 | 33 | 51 | Sample A laminated to Sample C |
| 14 | 24 | 36 | 47 | Sample A laminated to Sample C rotated 90° |

These results show that in both orientations the sample A/sample B laminate and the sample A/sample C laminate had a greater diffusing power (angle of view) than the standard (sample A) and that a pronounced asymmetry of diffusion is obtainable, by using a laminate including an anistropic component (e.g. sample C).

In another, and relatively simple variant, a diffusing sheet material produced by selective photo-polymerization of a photo-polymerisable material, for example as disclosed in EP0294122, W094/29768 or PCT/GB91/00795 (W091/18304), is provided with texturing or with additional texturing, by embossing the material (preferably after selective polymerization or at least after selective exposure) by means of an embossing plate or roller, or other appropriate embossing tool and with or without lamination of the embossed material to any other layer.

Likewise, a diffusion or projection screen may be made by directly embossing the Plexiglas-L material referred to above, comprising spherical particles in a polymethyl methacrylate matrix, for example after heating to soften the material, or possibly without heating, or similarly by directly embossing the product formed by stretching or orienting that Plexiglas-L material referred to above.

In those variants of the present invention in which two or more layers of light-transmitting material are laminated together, where the refractive index of any adhesive used to bond adjacent layers together permits, or where it is feasible to hold the superimposed sheets together only at their edges without adhesive between the layers, or possibly to bond the superimposed sheets together only at spaced apart locations, for example, one or more of the internal surfaces of one or more of these layers may be provided with surface features modifying the light-transmitting or diffusing characteristics of the product, for example may be formed with light-diffusing random texturing or may be formed with arrays of ribs defining Fresnel lenses.

What is claimed is:

1. A layer of polymeric material having a matrix and at least one surface, the layer of material suitable for use in a projection screen and comprising:
   an array of graded refractive index variations contained in the matrix, the variations imparting light-diffusing properties to the material; and
   a plurality of substantially random features on the surface, the features imparting light-collimating properties to the material.

2. The material of claim 1 wherein the array of graded refractive index variations contained in the matrix asymmetrically diffuses light in a first direction.

3. The material of claim 1 wherein the material collimates light a long an axis off-set from an axis normal to a plane defined by the layer of polymeric material.

4. The material of claim 1 wherein the layer of polymeric material further includes a second surface comprising features imparting light-diffusing properties to the material.

5. The material of claim 1 wherein the substantially random features comprise at least two irregularly-shaped ribs in parallel with one another.

6. The material of claim 1 wherein the substantially random features comprise at least two grooves arranged randomly with respect to one another and oriented in a direction in the plane of the material.

7. The material of claim 1 further comprising a light reflective layer in intimate contact with the material.

8. A layer of polymeric material having a matrix and at least one surface, the layer of material suitable for use in a projection screen and comprising:
   a plurality of asymmetrical particles embedded within the matrix, the particles having a refractive index different from the refractive index of the matrix, and imparting light-diffusing properties to the material; and
   a plurality of substantially random features on the surface, the features imparting light-collimating properties to the material.

9. The material of claim 8 wherein the plurality of asymmetrical particles embedded within the matrix asymmetrically diffuses light in a first direction.

10. The material of claim 8 wherein the material collimates light along an axis off-set from an axis normal to a plane defined by the layer of polymeric material.

11. The material of claim 8 wherein the layer of polymeric material further includes a second surface comprising features imparting light-diffusing properties to the material.

12. The material of claim 8 wherein the substantially random features comprise at least two irregularly-shaped ribs in parallel with one another.

13. The material of claim 8 wherein the substantially random features comprise at least two grooves arranged randomly with respect to one another and oriented in a direction in the plane of the material.

14. The material of claim 8 further comprising a light reflective layer in intimate contact with the material.

15. A polymeric material having a matrix and at least one surface, the material suitable for use in a projection screen and comprising:

a first layer including a plurality of asymmetrical particles embedded within the matrix, the particles having a refractive index different from the refractive index of the matrix, and imparting light-diffusing properties to the material; and a second layer in intimate contact with the first layer, the second layer having substantially random features on the surface, the features imparting light-collimating properties to the material.

16. The material of claim 15 wherein the plurality of asymmetrical particles embedded within the matrix asymmetrically diffuses light in a first direction.

17. The material of claim 15 wherein the material collimates light along an axis off-set from an axis normal to a plane defined by the layer of polymeric material.

18. The material of claim 15 wherein the substantially random features comprise at least two irregularly-shaped ribs in parallel with one another.

19. The material of claim 15 wherein the substantially random features comprise at least two grooves arranged randomly with respect to one another and oriented in a direction in the plane of the material.

20. The material of claim 15 further comprising a light reflective layer in intimate contact with the material.

21. A polymeric material having a matrix and at least one surface, the material suitable for use in a projection screen and comprising:

a first layer including an array of graded refractive index variations contained in the matrix, the variations imparting light-diffusing properties to the material; and a second layer in intimate contact with the first layer, the second layer having substantially random features on the surface, the features imparting light-collimating properties to the material.

22. The material of claim 21 wherein the array of graded refractive index variations contained in the matrix asymmetrically diffuses light in a first direction.

23. The material of claim 21 wherein said material collimates light along an axis off-set from an axis normal to a plane defined by the layer of polymeric material.

24. The material of claim 21 wherein the substantially random features comprise at least two irregularly-shaped ribs in parallel with one another.

25. The material of claim 21 wherein the substantially random features comprise at least two grooves arranged randomly with respect to one another and oriented in a direction in the plane of the material.

26. The material of claim 21 further comprising a light reflective layer in intimate contact with the material.

* * * * *